United States Patent
Onishi

(10) Patent No.: US 8,149,478 B2
(45) Date of Patent: Apr. 3, 2012

(54) IMAGE PROCESSING APPARATUS AND METHOD OF CONTROLLING SAME

(75) Inventor: Akiko Onishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1146 days.

(21) Appl. No.: 11/873,762

(22) Filed: Oct. 17, 2007

(65) Prior Publication Data

US 2008/0100885 A1    May 1, 2008

(30) Foreign Application Priority Data

Oct. 27, 2006  (JP) ................................ 2006-293152

(51) Int. Cl.
*H04N 1/04*  (2006.01)

(52) U.S. Cl. ........ 358/488; 358/449; 358/497; 358/486; 358/474

(58) Field of Classification Search .................. 358/488, 358/489; 399/368
See application file for complete search history.

(56) References Cited

U.S. PATENT DOCUMENTS 7,483,589 B2 *  1/2009  Ahmed et al. ................ 382/282

FOREIGN PATENT DOCUMENTS

JP         2002-010059         1/2002

* cited by examiner

*Primary Examiner* — James A Thompson
*Assistant Examiner* — Jonathan Beckley
(74) *Attorney, Agent, or Firm* — Fitzpatrick, Cella, Harper & Scinto

(57) ABSTRACT

In order to extract a plurality of items of image data corresponding to respective ones of a plurality of documents from scan data more accurately, an image processing apparatus is provided with a detection unit adapted to detect a plurality of image areas corresponding to the plurality of documents; a setting unit adapted to set a reference area size from sizes of the plurality of image areas; a comparison unit adapted to compare the sizes of the plurality of image areas and the reference area size; and a decision unit adapted to decide that an image area detected by the detection unit has not been detected correctly if result of the comparison by the comparison unit exceeds a preset threshold value.

7 Claims, 10 Drawing Sheets

IMAGE PROCESSING APPARATUS AND METHOD OF CONTROLLING SAME

BACKGROUND OF THE INVENTION

1. Field of the Invention

The present invention relates to a technique for cropping individual items of document image data from input image data containing a plurality of document images.

2. Description of the Related Art

An image reading device (referred to as a "scanner" below) reads documents such as photographs and text and generates electronic image data. For example, the specification of Japanese Patent Application Laid-Open No. 2002-010059 discloses a function that is convenient in a case where a document such as a print image smaller than the document glass of a scanner is scanned by the scanner. This function (referred to as "multi-crop scan" below) is such that when a plurality of documents are placed on the document glass of a scanner and scanned, the number of documents and their positions are detected automatically from the scan data. By cropping the individual documents from the scan data based upon the result of detection, the scanning of a plurality of documents is performed automatically by a single scanning operation.

More specifically, color scan data indicative of the entire surface of the document glass is acquired from the scanner and the acquired scan data is converted to a monochrome binary image using a predetermined threshold value. This threshold value is a value for determining whether or not a document is present. Since an area devoid of a document in the scan data has the color (white) of the document cover that presses a document against the document glass, the threshold value is set to a value that approximates white to thereby detect document position. By clipping each detected area from the scan data as individual image data, a plurality of images can be acquired by a single scan.

However, the optimum threshold value when a monochrome binary image for extracting document position is generated differs depending upon the color and material, etc., of the document. In the above-mentioned multi-crop scan, therefore, a problem which arises is that it is difficult to optimize the threshold value for all types of documents (material and colors, etc.). Consequently, there are instances where detection of document position fails owing to the type of document, thereby resulting in the acquisition of image data from which some documents are missing.

SUMMARY OF THE INVENTION

Accordingly, one aspect of the present invention provides a technique that makes it possible to implement highly precise multi-crop scanning.

According to one aspect of the present invention, an image processing apparatus for scanning a plurality of documents that have been placed in a scanning zone capable of being scanned by an image scanning unit and extracting a plurality of items of image data corresponding to respective ones of the plurality of documents, the apparatus comprising: a detection unit adapted to detect a plurality of image areas corresponding to the plurality of documents; a setting unit adapted to set a reference area size from sizes of the plurality of image areas; a comparison unit adapted to compare the sizes of the plurality of image areas and the reference area size; and a decision unit adapted to decide that an image area detected by the detection unit has not been detected correctly if result of the comparison by the comparison unit exceeds a preset threshold value.

According to another aspect of the present invention, a method of controlling an image processing apparatus for scanning a plurality of documents that have been placed in a scanning zone capable of being scanned by an image scanning unit and extracting a plurality of items of image data corresponding to respective ones of the plurality of documents, the method comprising the steps of: detecting a plurality of image areas corresponding to the plurality of documents; setting a reference area size from sizes of the plurality of image areas; comparing the sizes of the plurality of image areas and the reference area size; and deciding that an image area detected at the detecting step has not been detected correctly if result of the comparison at the comparing exceeds a preset threshold value.

According to still another aspect of the present invention, a computer program, which has been stored on a computer-readable recording medium, for causing an image processing apparatus, which is for scanning a plurality of documents that have been placed in a scanning zone capable of being scanned by an image scanning unit and extracting a plurality of items of image data corresponding to respective ones of the plurality of documents, to execute the steps of: detecting a plurality of image areas corresponding to the plurality of documents; setting a reference area size from sizes of the plurality of image areas; comparing the sizes of the plurality of image areas and the reference area size; and deciding that an image area detected at the detecting step has not been detected correctly if result of the comparison at the comparing exceeds a preset threshold value.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail with reference to the drawings. It should be noted that the embodiments below are exemplary and do not limit the scope of the present invention.

First Embodiment

A first embodiment of an image processing apparatus according to the present invention will be described below taking an image scanning system as an example.

Overall System Configuration

Figure 1:
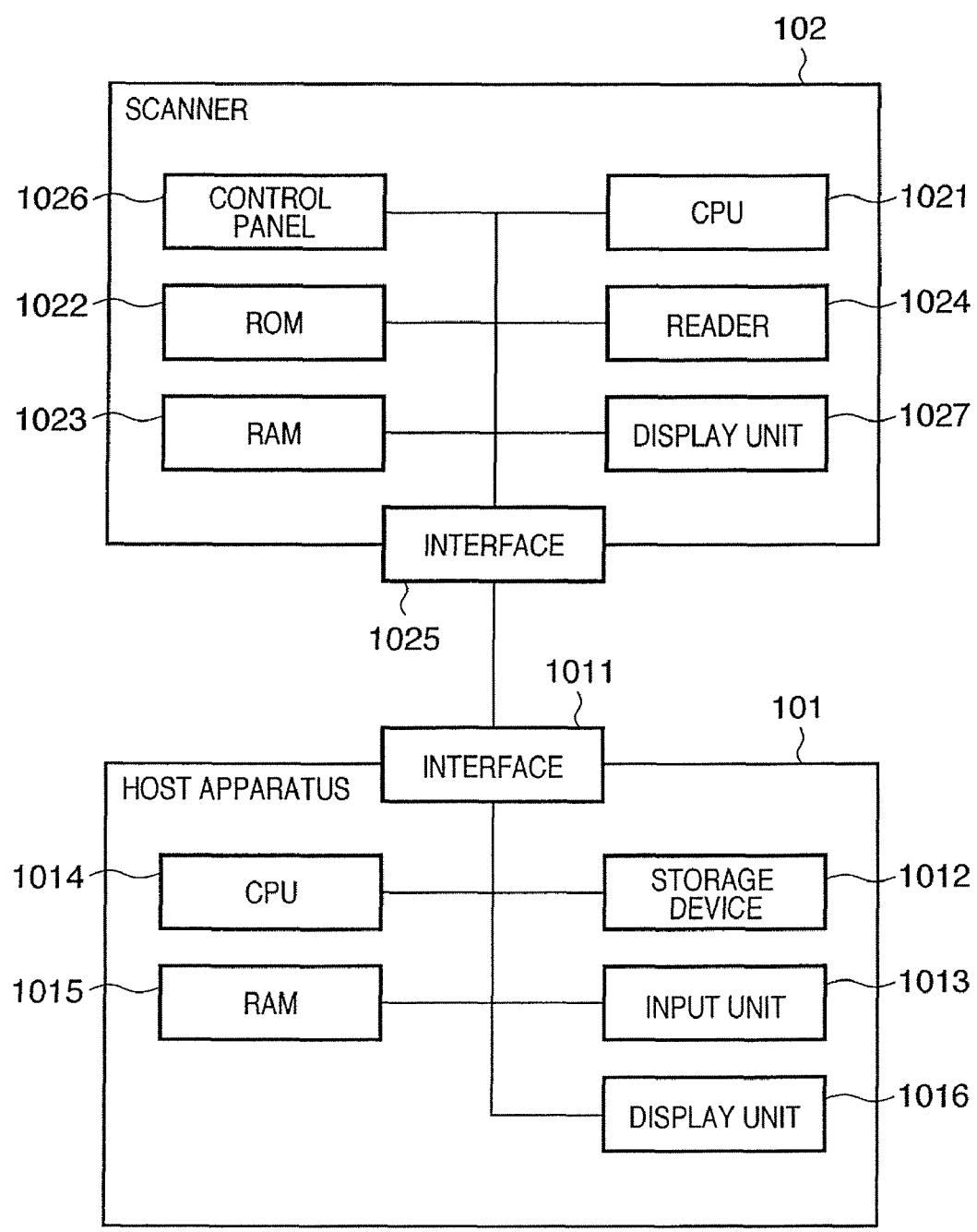
FIG. 1 is a block diagram illustrating the configuration of an image scanning system according to a first embodiment of the present invention.

FIG. 1 is a block diagram illustrating the configuration of an image scanning system according to a first embodiment of the present invention. The image scanning system comprises a host apparatus 101 and a scanner 102 for scanning a document and sending it to the host apparatus 101 as image data.

The scanner 102 is, for example, a color scanner, in which a CCD line sensor (not shown) is caused to scan and optically read a document that has been placed on a document glass and then convert the read image into an electric signal. The electric signal is divided into a plurality of color components, for example, R, G, B, and each component is multivalued data composed of 8 to 16 bits.

A CPU 1021 is a central processing unit for controlling the system component set forth below. A ROM 1022, which is a read-only memory, stores the program that controls the scanner 102. A RAM 1023, which is a random-access memory, temporarily stores a program necessary for operation of the scanner 102 and setting parameters, etc., transmitted from the host apparatus 101.

A reader 1024 reads an image from a document based upon control exercised by the CPU 1021. An interface 1025 functions to receive data from the host apparatus 101 and transmits read image data from the reader 1024 to the host apparatus 101. A control panel 1026 provides various buttons such as a scan button for controlling image scanning from the scanner 102. A display unit 1027 displays the status of an operation performed at the control panel 1026 and the status of the scanner settings.

The host apparatus 101, an example of which is a personal computer, processes control commands of the scanner 102 and image data that has been read by the scanner 102. A CPU 1014, which is a central processing unit for controlling the components of the host apparatus 101, executes the control program of a scanner driver, etc., described later. A RAM 1015 is a random-access memory that provides a working area for the CPU 1014. A storage device 1012 stores various control programs such as the control program of the scanner driver.

An input unit 1013 is constituted by a keyboard or mouse, etc., for operating the host apparatus 101. A display unit 1016 presents a display for checking information that has entered from the input unit 1013 or displays a scanner driver, the user interface of an application and messages, etc. An interface 1011 is for sending and receiving data to and from the scanner 102.

Figure 2:
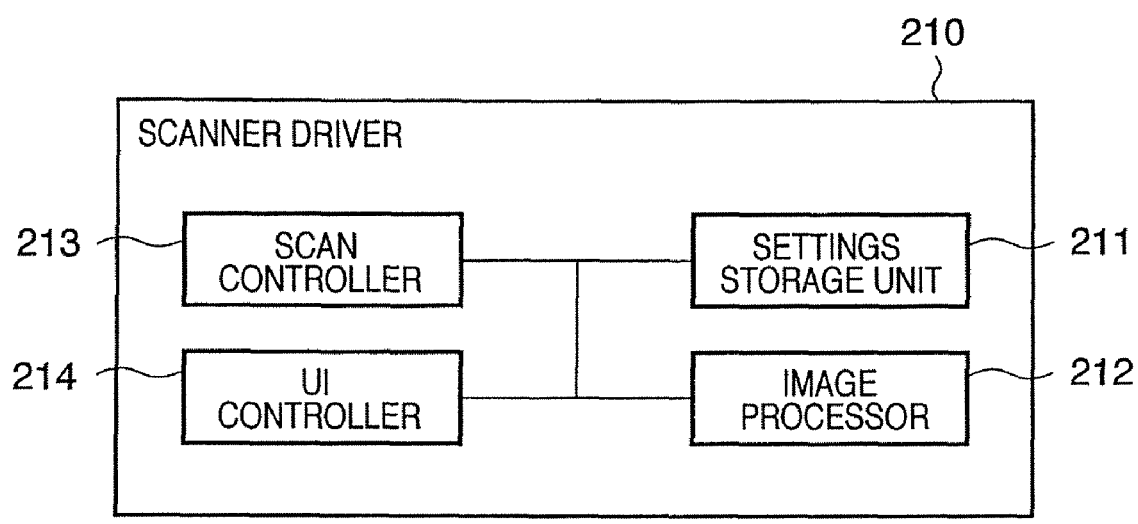
FIG. 2 is a diagram illustrating the internal structure of a scanner driver.

FIG. 2 is a diagram illustrating the internal structure of a scanner driver 210. The scanner driver 210 includes a settings storage unit 211, an image processor 212, a scan controller 213 and a user-interface (UI) controller 214. As mentioned above, these components are implemented owing to execution of the scanner driver 210 by the CPU 1014.

The UI controller 214 displays and controls a user-interface screen (referred to as a "user UI" below) in order to cause the scanner 102 to execute an image scanning operation. The user specifies various settings (e.g., scanning speed, scanning range, scanning mode, correction processing, etc.) when an image is scanned. This is performed via the driver UI displayed on the display unit 1016 by the UI controller 214.

The driver UI has a button for performing multi-crop scanning to simultaneously scan a plurality of documents that have been placed on the document glass. The driver UI is provided with a setting item (a check box or the like) for setting a "same-size-document multi-crop" mode, which is for specifying that the plurality of documents placed on the document glass are of the same size. This is specified by the user in a case where a plurality of originals of the same size, such as a business card, photograph and postcard, are scanned at the time of multi-crop scanning. By performing multi-crop scanning by turning on the "same-size-document multi-crop" mode, processing for adjusting cropping is executed based upon discrimination of a document for which cropping has failed, as described later. The UI controller 214 stores these items of setting information in the settings storage unit 211.

The settings storage unit 211 stores a plurality of parameter sets (P0, P1, . . . , Pn) used in detecting crop images. One parameter set includes parameters such as a binarization threshold value and contrast.

The scan controller 213 is a functional unit which, upon being instructed to execute scanning via the driver UI, sends the scanner 102 an instruction for performing scanning in accordance with the settings that have been stored in the settings storage unit 211. Further, the scan controller 213 acquires data, such as a scan image, transmitted from the scanner 102 based upon the transmitted instruction.

The image processor 212 is a functional unit for executing multi-crop processing (described later), etc., based upon the settings that have been stored in the settings storage unit 211 and the scan image that has been acquired.

<Processing Flow at Execution of Scanning>

Figure 3:
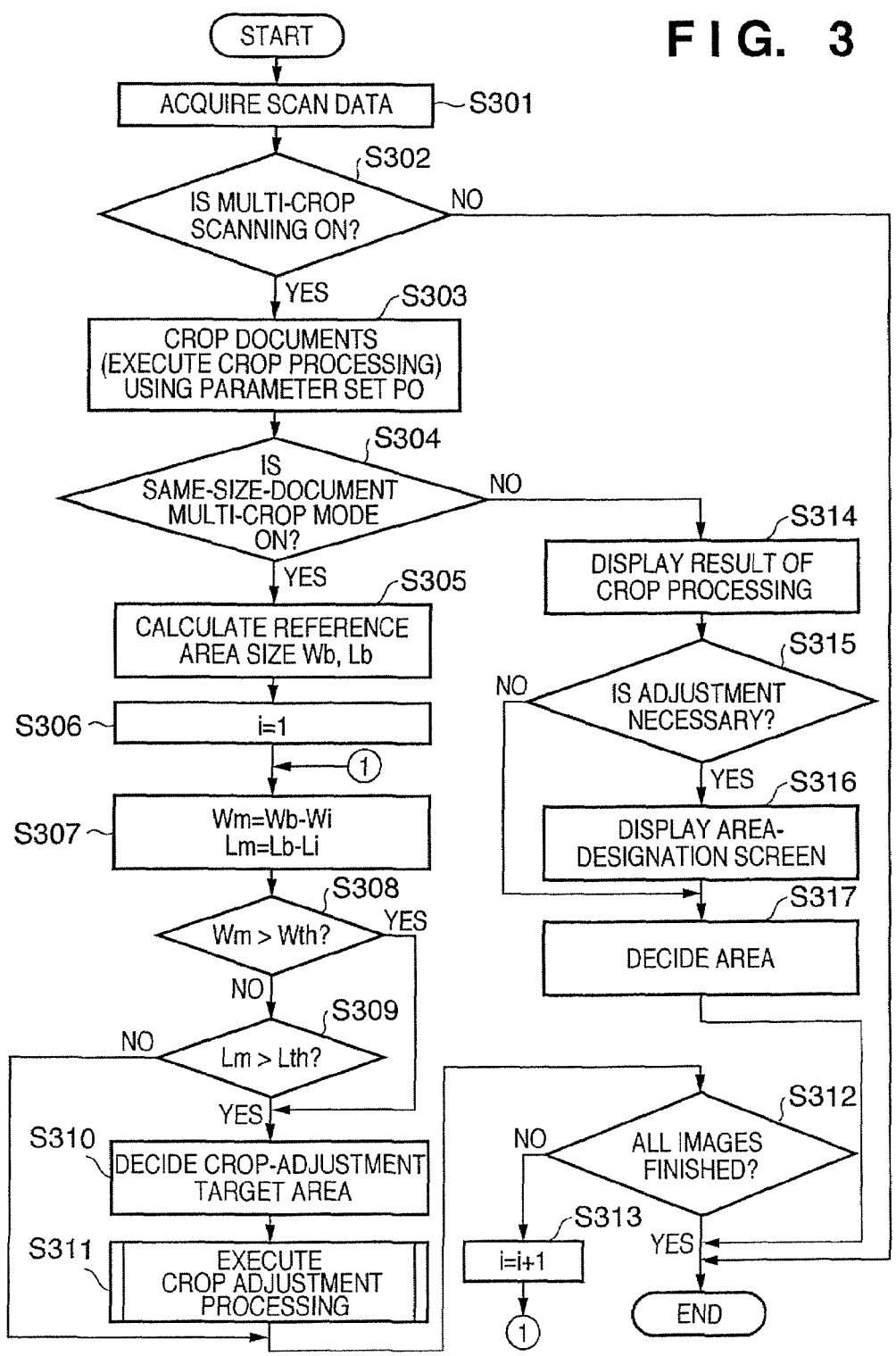
FIG. 3 is a flowchart illustrating an image scanning/extracting operation according to the first embodiment.

FIG. 3 is a flowchart illustrating an image scanning/extracting operation according to the first embodiment. It should be noted that each step set forth below is implemented by execution of the scanner driver 210 using CPU 1014.

In step S301, the scan controller 213 executes scanning by the reader 1024 in accordance with the scan settings that have been stored in the settings storage unit 211. This is executed in accordance with a scan command accepted from the user via the driver UI displayed by the UI controller 214 of scanner driver 210. It should be noted that the content of the settings made using the driver UI are stored in the settings storage unit 211. When scanning by the reader 1024 of the scanner 102 is completed, the host apparatus 101 acquires the scan data from the scanner 102.

Figure 4:
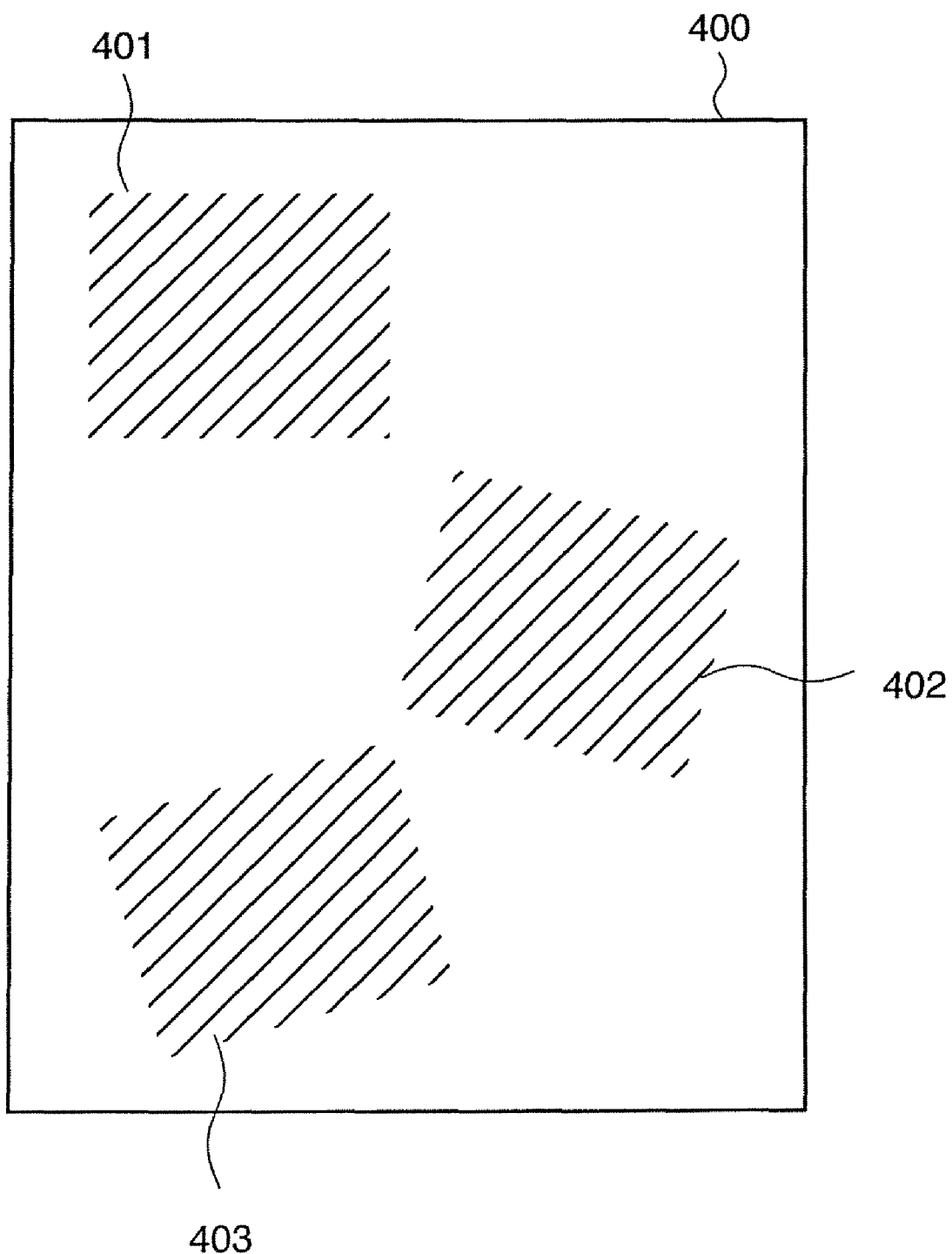
FIG. 4 is a diagram exemplifying images in scan data generated by scanning performed by a scanner.

FIG. 4 is a diagram exemplifying images in scan data generated by scanning performed by a scanner. Shown in FIG. 4 are an overall scan image 400 and image areas 401 to 403 corresponding to respective ones of three documents that have been placed on a document glass.

In step S302, whether multi-crop scanning has been specified is determined based upon the settings that have been stored in the settings storage unit 211. If multi-crop scanning has been specified, control proceeds to step S303. If multi-crop scanning has not been specified, then processing is exited upon saving the acquired scan data or sending it to an application.

In step S303, the scan data acquired in step S301 undergoes detection of document positions and crop processing. It is assumed here that detection of document position at this step is executed using the crop parameter setting P0 that has been stored in the settings storage unit 211.

Figure 5:
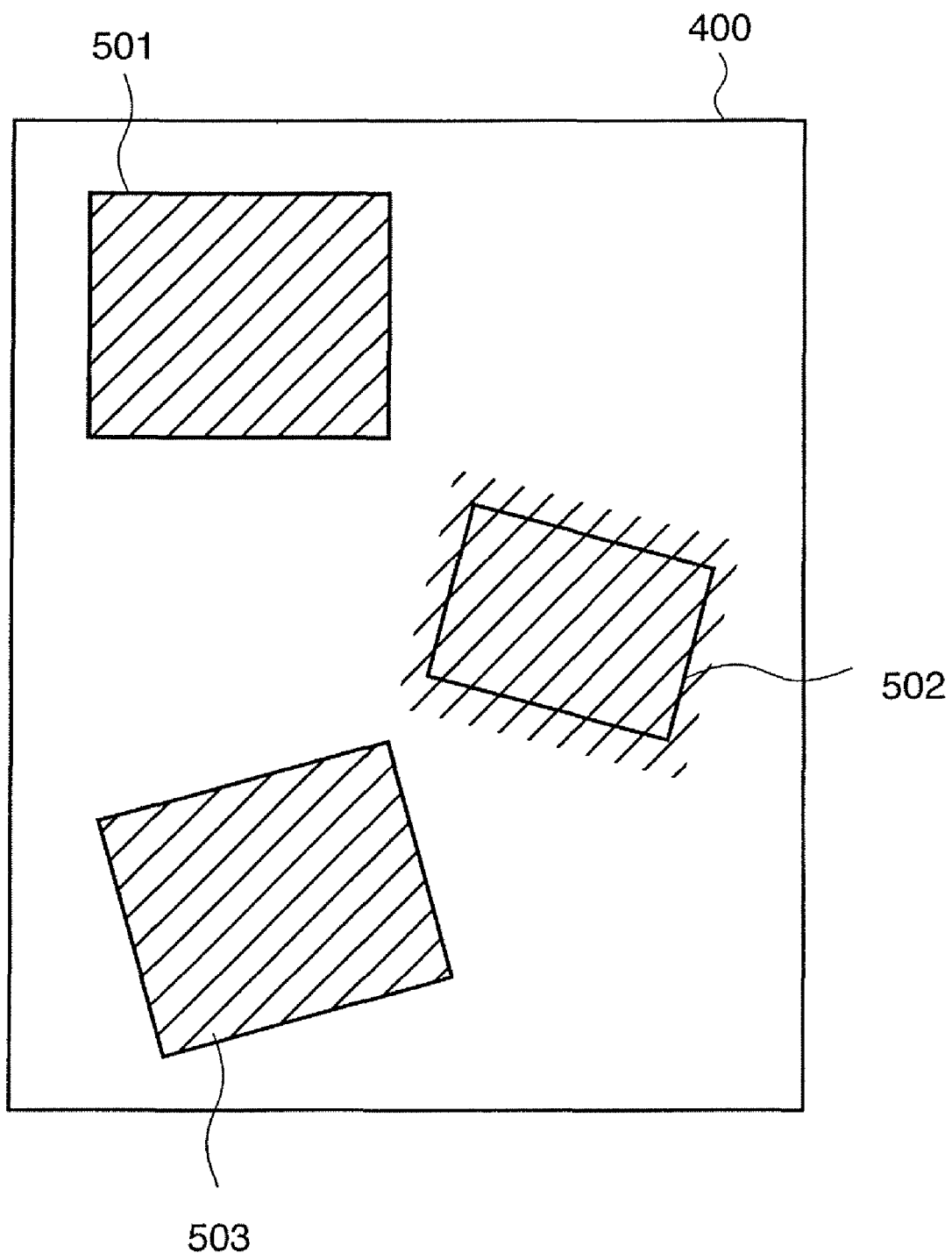
FIG. 5 is a diagram exemplifying a state in which crop images have been detected by applying crop processing to scan data.

FIG. 5 is a diagram exemplifying a state in which crop images have been detected by applying crop processing to scan data. Shown in FIG. 5 are the overall scan image 400 and crop images 501 to 503 corresponding to the image areas 401 to 403, respectively. Specifically, FIG. 5 illustrates a state in which the crop image 502, the image area of which is smaller than the image area 402 (FIG. 4), has been detected erroneously.

In step S304, whether or not the "same-size-document multi-crop" mode has been specified is determined based upon the settings that have been stored in the settings storage unit 211. If the "same-size-document multi-crop" mode has been specified, control proceeds to step S305. If the "same-size-document multi-crop" mode has not been specified, on the other hand, then the crop images 501 to 503 cropped in step S303 are subjected to the processing from step S314 onward.

In step S314, the result of crop processing of the crop images 501 to 503 is displayed on the display unit 1027. In other words, the user is prompted to check the result of crop processing. In step S315, a determination as to whether the result of crop processing is correct or not is accepted from the user by the input unit 1013, etc. If the user determines that the result is correct, control proceeds to step S317. If adjustment is required, then control proceeds to step S316. In step S316, a screen display for accepting a designation of crop area is presented and a designation of the correct crop area is accepted from the user by the input unit 1013, etc. In step S317, the crop area is decided and processing is executed upon saving the crop images 501 to 503 or sending them to an application.

In step S305, "reference area size" is decided based upon the sizes of the plurality of crop images 501 to 503 acquired by the crop processing in step S303. Here Wb and Lb represent the width and height, respectively, of the reference area size. It should be noted that the reference area size is decided by any of the following methods based upon the sizes of the plurality of crop images 501 to 403:
- the size of the largest crop image;
- the average size of crop images that remain upon excluding crop images whose sizes are smaller, by more than a prescribed amount, than with the largest crop image;
- a fixed size closest to the average size of crop images that remain upon excluding crop images whose sizes are smaller, by more than a prescribed amount, than the largest crop image; and
- a size specified by the user in advance (settings stored in the settings storage unit 211).

These methods may be implemented by selecting any one of them in advance, or they may be specified and changed over by the user.

In steps S306 to S313 below, the plurality of crop images 501 to 503 and the reference area size are compared and an image that is smaller, by more than a predetermined prescribed amount, than the reference area size, is discriminated. In the case of a crop image determined to be small, it is construed that crop processing involves a problem and "crop adjustment processing" is executed.

In step S306, one of the plurality of crop images 501 to 503 acquired by the processing in step S303 is selected. In the description given below, indices i corresponding to the crop images 501 to 503 are represented by 1 to 3, respectively. Here i=1 is set.

In step S307, the computations Wm=Wb−Wi and Lm=Lb−Li are performed, whereby width and height differences Wm, Lm, respectively, between the reference area size and the ith crop image are calculated. Here Wi and Li signify the width and height of the crop image having the index i.

In step S308, Wm is compared with a threshold value Wth specified in advance. If Wm>Wth holds, control proceeds to step S310. If Wm≦Wth holds, control proceeds to step S309.

In step S309, Lm is compared with a threshold value Lth specified in advance. If Lm>Lth holds, control proceeds to step S310. If Lm≦Lth holds, control proceeds to step S312.

Figure 6:
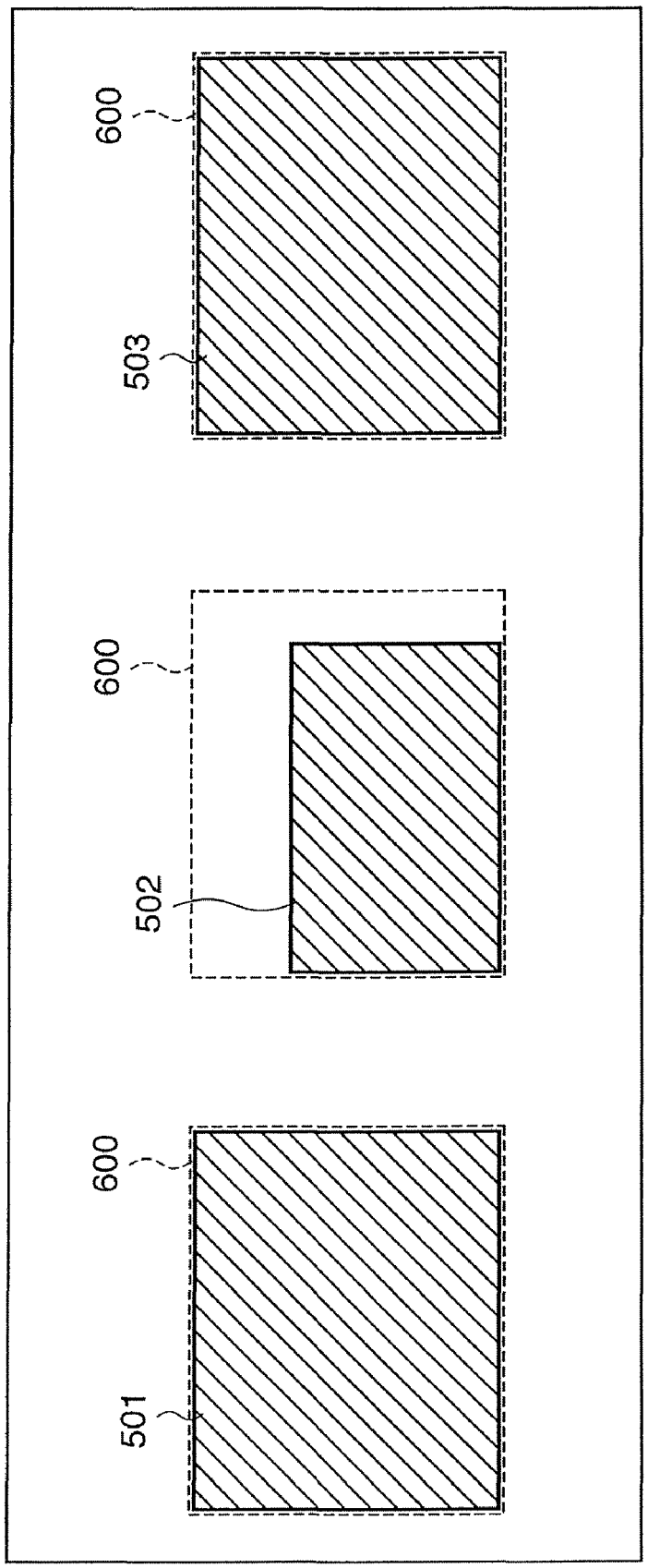
FIG. 6 is a conceptual view of processing of steps S307 to S309.

FIG. 6 illustrates the manner in which the crop images 501 to 503 are compared with the reference area size 600 of Wb×Lb in the processing of steps S307 to S309. In this example, it is determined that the width and height of the crop image 502 are smaller than those of the reference area size 600 by an amount specified in advance. That is, it is determined in steps S307 to S309 that Wm and Lm, which are the differences between the width Wb and height Lb of the reference area size 600 and the width Wi and height Li of the crop image 502, are greater than Wth, Lth, respectively. As a result, the crop image 502 is subjected to the processing from step S310 onward.

In step S310, an area that includes the crop image of index i is decided upon as a "crop-adjustment target area". The "crop-adjustment target area" is an area, which is centered on the area of crop image of index i in the scan data 400, that enables an image having the reference area size to be obtained by enlarging the area of the crop image. For example, an area that is the result of enlarging the area of the crop image of index i by Wm in both the up and down directions of the image and by Lm in both the left and right directions of the image is adopted as the crop-adjustment target area. If we let Wa and La represent the width and height, respectively, of the crop-adjustment target area in this case, then these can be calculated according to Equations (1) and (2), respectively, below.

$$Wa = Wi + Wm \times 2 \qquad \text{Equation (1)}$$

$$La = Li + Lm \times 2 \qquad \text{Equation (2)}$$

Figure 7:
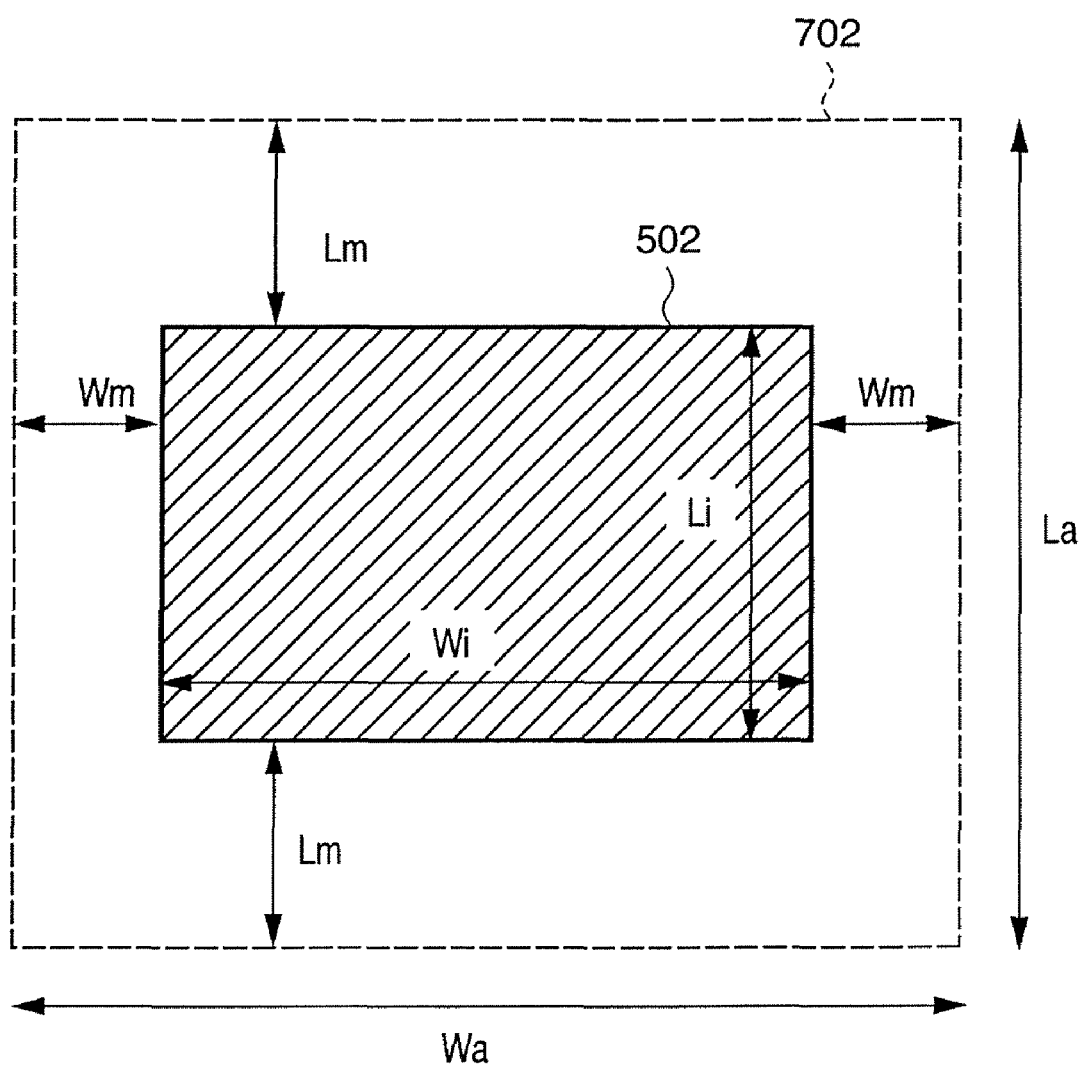
FIG. 7 is a diagram exemplifying a crop-adjustment target area obtained by enlarging the area of a crop image vertically and horizontally.
Figure 8:
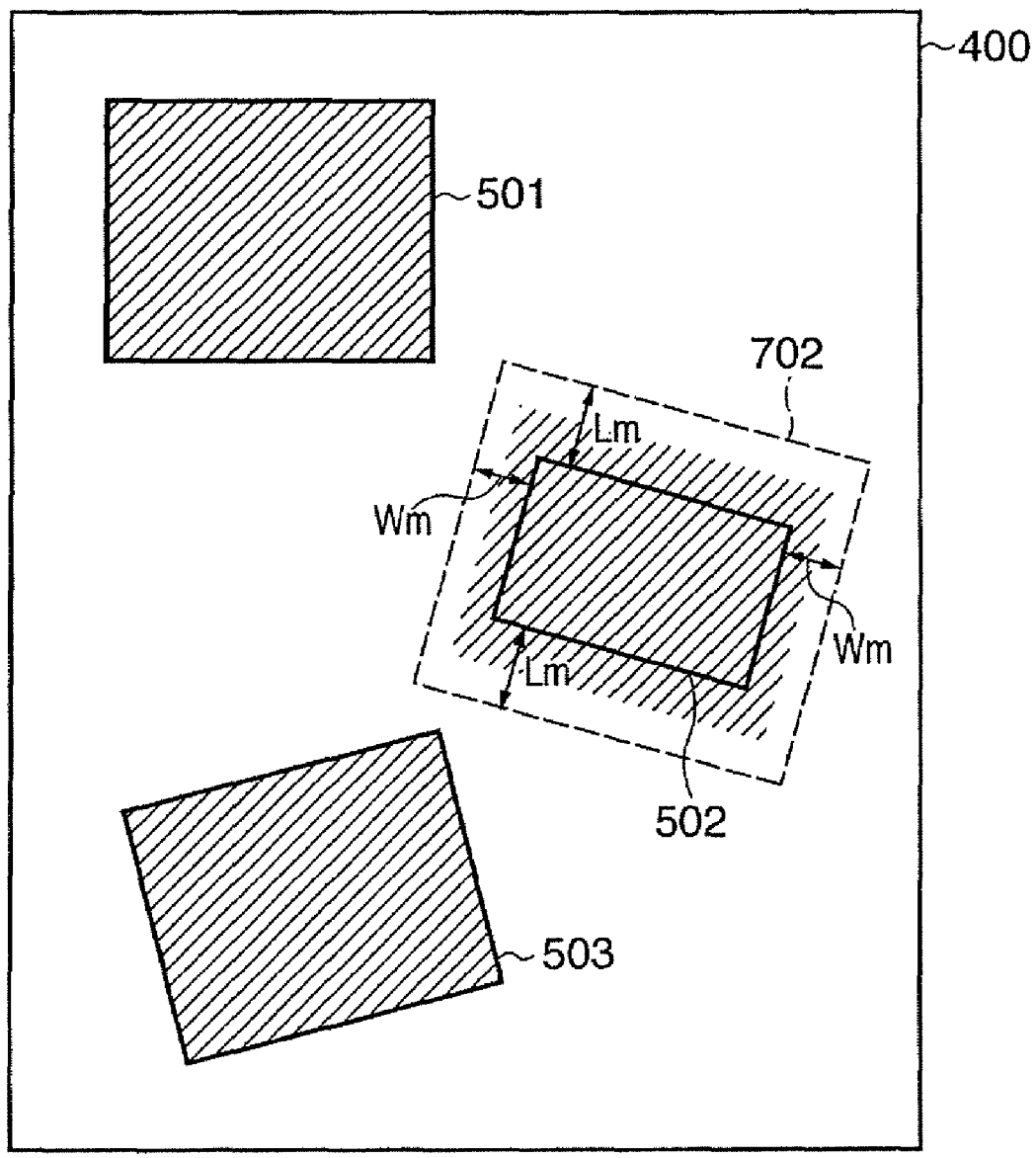
FIG. 8 is a diagram exemplifying crop images and a crop-adjustment target area in scan data.

FIG. 7 is a diagram exemplifying a crop-adjustment target area 702 obtained by enlarging the crop image 502 vertically by 2×Lm and horizontally by 2×Wm. FIG. 8 is a diagram exemplifying the position of the crop image 502 and the position of the crop-adjustment target area 702 in the scan data 400.

In step S311, "crop adjustment processing" is applied to the crop-adjustment target area 702 of scan data 400. The crop adjustment processing will be described later.

In step S312, it is determined whether a crop image that has not been subjected to the processing of steps S307 to S309 remains. If such a crop image remains, i is incremented in step S313 (i=i+1) to thereby make the next crop image the image of interest. On the other hand, if it is determined that crop images no longer remain, then processing is exited upon saving all crop images or sending them to an application.

A crop image that is saved or sent to an application is a crop image that has been cropped in step S303 or a crop image that is the result of subjecting this crop image to crop adjustment processing in step S311.

<Details of Crop Adjustment Processing>

Figure 10:
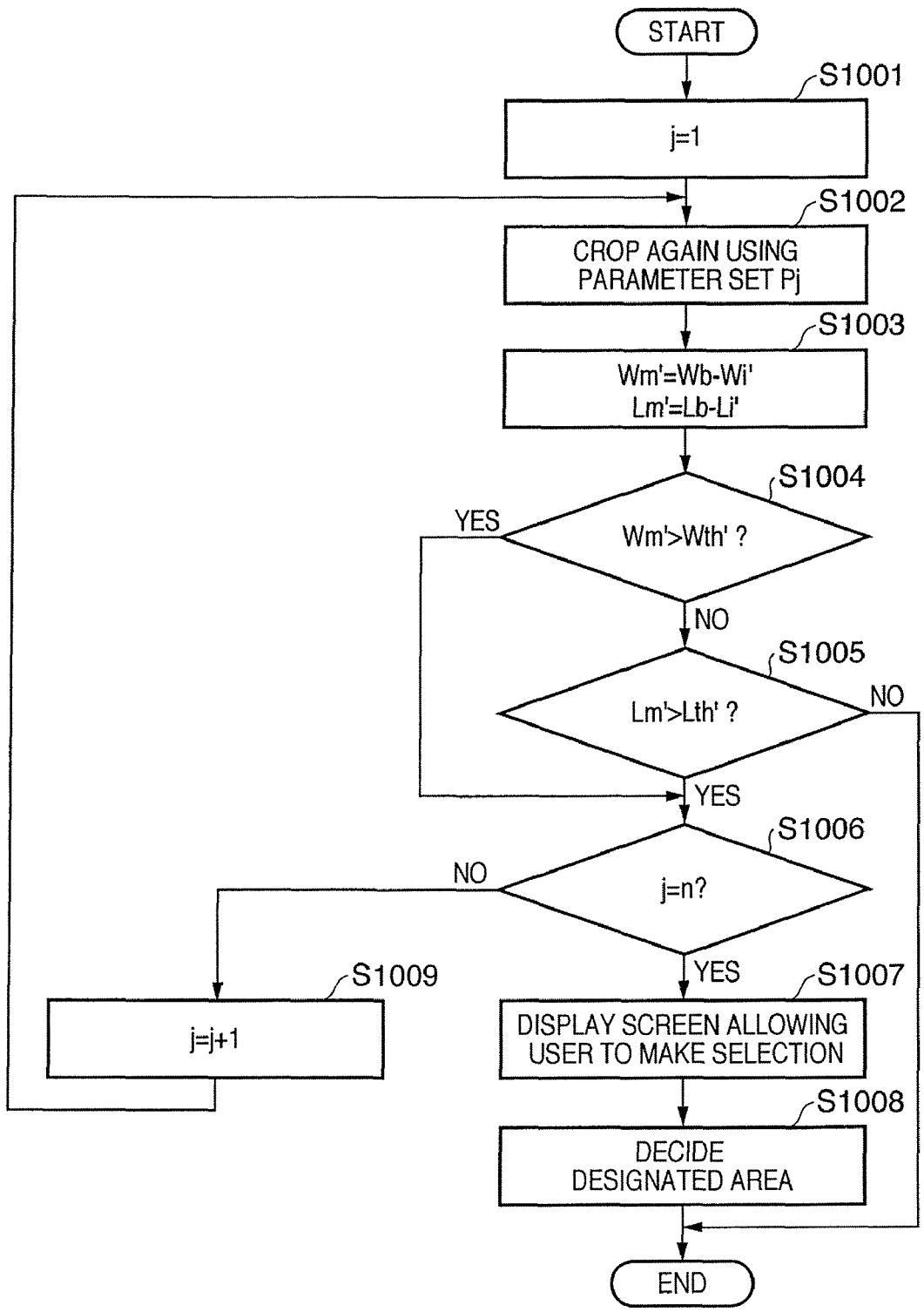
FIG. 10 is a flowchart illustrating crop adjustment processing.

FIG. 10 is a flowchart illustrating crop adjustment processing (step S311).

In step S1001, a parameter set Pj different from P0 is read out of the settings storage unit 211. Here j represents an index indicating the number of times re-cropping is performed. Here j=1 is set.

In step S1002, the crop-adjustment target area decided in step S310 is subjected to crop processing again using the parameter set Pj. Let Wi' and Li' represent the width and height, respectively, of the crop image acquired as a result.

In step S1003, the calculations Wm'=Wb−Wi' and Lm'=Lb−Li' are performed to calculate, as Wm' and Lm', the differences between the widths and heights, respectively, of the reference area size and crop image of interest. Here Wi' and Li' signify the width and height, respectively, of the crop image of interest (index i).

In step S1004, Wm' is compared with a threshold value Wth' specified in advance. Control proceeds to step 1006 if Wm'>Wth' holds and to step S1005 if Wm'≦Wth' holds.

In step S1005, Lm' is compared with a threshold value Lth' specified in advance. Control proceeds to step 1006 if Lm'>Lth' holds and processing is exited (proceeds to step S312) if Lm'≦Lth' holds.

It should be noted that Wth' and Lth' may be made values identical with Wth and Lth mentioned above, or values that are different may be used.

In step S1006, it is determined whether the re-cropping count j is equal to a count n specified in advance. If j has not reached n, then the index j is incremented (j=j+1) at step S1009, the next parameter set is read in and control returns to step S1002. In other words, the parameter Pj decides beforehand the maximum number of times re-cropping is re-executed by changing the parameter Pj, and therefore Pj is an integer of 1 or greater. If it is determined at step S1006 that re-crop processing has been performed n times, on the other hand, then control proceeds to step S1007.

Figure 9:
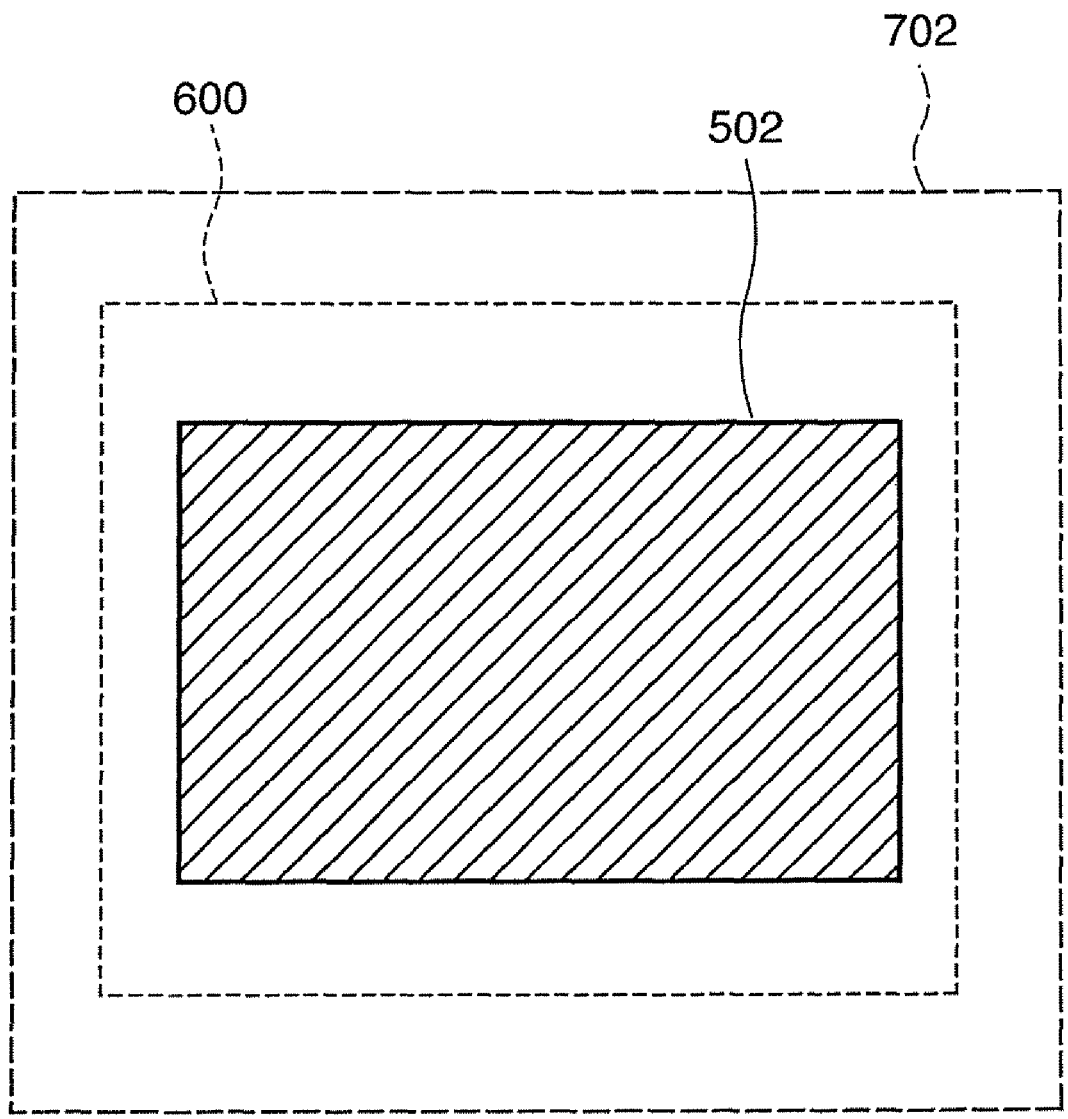
FIG. 9 is a diagram illustrating an example of a screen display that accepts designation of a crop area.

In step S1007, a screen display for accepting a designation of crop area from the user is presented and a designation of the correct crop area is accepted. FIG. 9 is a diagram illustrating an example of the screen display that accepts designation of a crop area. Shown in FIG. 9 are the crop image 502 in the scan data 400, the reference area size 600 and the crop-adjustment target area 702. The crop-adjustment target area 702 illustrated here is the same as the target area for re-executing repetitive crop processing in step S1002.

In step S1008, the area designated by the user in step S1007 is cropped from the scan data 400 and adopted as the crop image.

In the description rendered above, re-cropping (step S1002) by the scanner driver 210 is performed a prescribed number of times (n times). In a case where the crop image nevertheless is not smaller than the reference area size by more than the fixed amount, the user is allowed to designate the crop area directly by means of the user interface (step S1007). However, it is permissible to change the parameter set and only repeat the processing for executing re-cropping (step S1002) a prescribed number of times. In other words, it is permissible to adopt an arrangement in which processing for designating the crop area by the user (step S1007) is not executed. Further, the parameter need not be changed and the processing for re-executing cropping (step S1002) need not be executed. In other words, it may be so arranged that only the processing for designating the crop area by the user (step S1007) is executed.

In accordance with the image scanning system of the first embodiment, as described above, it is possible to implement multi-crop scanning that is more accurate. In other words, a reference area size is decided based upon the sizes of a plurality of crop images that have been cropped by multi-crop scanning, or based upon a setting made by the operator. By discriminating that an image smaller than the reference area size by more than a fixed amount represents cropping failure, cropping failure can be detected automatically without user operation. Further, crop parameters are changed and crop adjustment processing for optimizing document cropping processing is executed only for a document area discriminated to have undergone cropping failure. As a result, the accuracy of multi-crop processing when documents of various materials are mixed can be improved. Furthermore, by re-executing only image crop processing of scan data, the accuracy of crop processing can be improved without re-executing scan processing.

In this embodiment, the invention has been described by an example regarding a case where so-called pre-scanning for executing scanning at low resolution in order to acquire a preview image is not carried out. It is permissible to use a reading method in which main scanning is performed after pre-scanning is carried out. More specifically, by performing pre-scanning in which scanning is carried out at low resolution, the above-mentioned crop adjustment processing is applied to the crop-target area in the scan data 400, information representing the position of a correct crop area in the scan data 400 is acquired and this information is stored in the RAM 1023. In main scanning, information representing the position of the correct crop area acquired by pre-scanning is acquired from the RAM 1023 and the crop area is read at high resolution using the acquired position information, thereby executing processing for extracting the crop image.

Further, in this embodiment, it is assumed that the parameter sets P0, P1, . . . Pn used in crop processing have been stored in the settings storage unit 211 beforehand. However, values obtained by applying a change to a parameter set, which has been stored in the setting storage unit, based upon setting information at the time of scanning may be used as a parameter set.

Further, in this embodiment, the invention has been described with regard to an example in which crop processing and crop adjustment processing, etc., is executed by executing the scanner driver 210 in the host apparatus 101. However, it is permissible to use a method of executing this processing by running software stored in the scanner 102, and transferring a plurality of crop images from the scanner 102 to the scanner driver 210 of the host apparatus 101.

Furthermore, in this embodiment, the invention has been described with regard to an example in which a crop image and a reference area size are compared and, if the value is greater than a threshold value, it is construed that crop processing has developed a problem. Crop adjustment processing is then executed. However, it is permissible to adopt a method of determining whether crop processing has developed a problem, notifying the user if a problem has been found, and either continuing crop adjustment processing or providing selecting means for allowing the user to select a crop area directly.

Other Embodiments

Although an embodiment of the present invention has been described above, the present invention may be applied to a system constituted by a plurality of devices (e.g., a host computer, interface, reader, printer, etc.) or to an apparatus comprising a single device (e.g., a copier or facsimile machine, etc.).

Furthermore, the object of the invention is attained also by supplying a program, which implements the functions of the foregoing embodiment, directly or remotely to a system or apparatus, reading the supplied program codes by the system or apparatus, and then executing the program codes. Accordingly, since the functional processing of the present invention is implemented by computer, the computer program per se installed on the computer falls within the technical scope of the present invention.

In this case, so long as the system or apparatus has the functions of the program, the form of the program, for example, object code, a program executed by an interpreter or script data supplied to an operating system, etc., does not matter.

Examples of recording media that can be used for supplying the program are a floppy (registered trademark) disk, hard disk, optical disk (CD, DVD), magneto-optical disk, magnetic tape, non-volatile type memory card and ROM, etc.

Further, it may be so arranged that the functions of the above-described embodiment are implemented by having a computer execute a program that has been read. In addition, an operating system or the like running on the computer may perform all or a part of the actual processing based upon the instructions of the program so that the functions of the foregoing embodiment can be implemented by this processing.

Furthermore, a program that has been read from a recording medium is written to a memory provided on a function expansion board inserted into the computer or provided in a function expansion unit connected to the computer. A CPU or the like provided on the function expansion board or in the function expansion unit subsequently performs a part of or all of the actual processing based upon the instructions of the program codes and implements the functions of the above embodiment by such processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-293152, filed Oct. 27, 2006, which is hereby incorporated by reference herein in its entirety.

What is claimed is:

1. An image processing apparatus comprising:
   a scanning unit for scanning a scanning zone in which a plurality of documents may be placed, and for acquiring an overall image of the scanning zone;
   an image detection unit configured to detect a plurality of image areas in the overall image each corresponding to a respective one of the plurality of documents in the scanning zone, wherein the plurality of image areas is detected by using a predetermined parameter;
   a size detection unit configured to detect a size of each of the plurality of image areas;
   a setting unit configured to set a reference area size as the sizes of the plurality of image areas;
   a calculating unit configured to calculate the difference between each of the sizes of the plurality of image areas and the reference area size; and
   a decision unit configured to decide that an image area detected by the image detection unit has been detected correctly if the difference is equal to or less than a preset threshold value, and to decide that an image area detected by the image detection unit has not been detected correctly if the difference exceeds the preset threshold value,
   wherein responsive to a decision that the image area has not been detected correctly, the predetermined parameter is changed, and operations of image detection by the image detection unit, size detection by the size detection unit, and calculation by the calculating unit, are all repeated until the difference is equal to or less than the preset threshold value.

2. The apparatus according to claim 1, wherein the largest image area size among the sizes of the plurality of image areas is adopted as the reference area size.

3. The apparatus according to claim 1, wherein the average of image area sizes that remain upon excluding image area sizes smaller, by more than a prescribed amount, than the largest image area size among the sizes of the plurality of image areas is adopted as the reference area size.

4. The apparatus according to claim 1, wherein a predetermined fixed size closest to an average size of image area sizes that remain upon excluding image area sizes smaller, by more than a prescribed amount, than the largest image area size among the sizes of the plurality of image areas is adopted as the reference area size.

5. The apparatus according to claim 1, further comprising an image area designating unit which receives a designation of the image area from a user, if the difference does not become equal to or less than the preset threshold value even though the predetermined parameter has been changed.

6. A method of controlling an image processing apparatus, wherein the image processing apparatus is interfaced to a scanning unit for scanning a scanning zone in which a plurality of documents may be placed, the method comprising:
   acquiring an overall image of the scanning zone;
   an image detecting step of detecting a plurality of image areas in the overall image each corresponding to a respective one of the plurality of documents in the scanning zone, wherein the plurality of image areas is detected by using a predetermined parameter;
   a size detecting step of detecting a size of each of the plurality of image areas;
   setting a reference area size as the sizes of the plurality of image areas;
   calculating the difference between each of the sizes of the plurality of image areas and the reference area size; and
   deciding whether an image area detected at the image detecting step has or has not been detected correctly, wherein there is a decision that an image area has been detected correctly if the difference is equal to or less than a preset threshold value, and there is a decision that an image area has not been detected correctly if the difference exceeds the preset threshold value,
   wherein responsive to a decision that the image area has not been detected correctly, further comprising:
   changing the predetermined parameter; and
   repeating the steps of image detection, size detection and calculation until the difference is equal to or less than the preset threshold value.

7. A non-transitory computer-readable recording medium on which a computer program is retrievably stored, wherein with respect to a computer interfaced to a scanning unit for scanning a scanning zone in which a plurality of documents may be placed, the computer program causes the computer to function as an image processing apparatus and to execute the steps of:
   acquiring an overall image of the scanning zone;
   an image detecting step of detecting a plurality of image areas in the overall image each corresponding to a respective one of the plurality of documents in the scanning zone, wherein the plurality of image areas is detected by using a predetermined parameter;
   a size detecting step of detecting a size of each of the plurality of image areas;
   setting a reference area size as the sizes of the plurality of image areas;
   calculating the difference between each of the sizes of the plurality of image areas and the reference area size; and
   deciding whether an image area detected at the image detecting step has or has not been detected correctly, wherein there is a decision that an image area has been detected correctly if the difference is equal to or less than a preset threshold value, and there is a decision that an image area has not been detected correctly if the difference exceeds the preset threshold value, wherein responsive to a decision that the image area has not been detected correctly, the steps further comprise:

changing the predetermined parameter; and repeating the steps of image detection, size detection and calculation until the difference is equal to or less than the preset threshold value.

* * * * *